United States Patent [19]

Sutherland et al.

[11] Patent Number: 4,697,093
[45] Date of Patent: Sep. 29, 1987

[54] TESTABLE, FAULT-TOLERANT POWER INTERFACE CIRCUIT FOR CONTROLLING PLANT PROCESS EQUIPMENT

[75] Inventors: James F. Sutherland, Plum Boro; William L. Miller, West Deer Township, Allegheny County, both of Pa.

[73] Assignee: Westinghouse Electric Corp., Pittsburgh, Pa.

[21] Appl. No.: 694,190

[22] Filed: Jan. 23, 1985

[51] Int. Cl.⁴ .................... G21C 7/36; G08B 23/00
[52] U.S. Cl. .................................. 307/38; 307/41; 376/245; 376/215; 340/507
[58] Field of Search .................... 307/34, 35, 36, 38, 307/39, 40, 41; 376/207, 209, 215, 216, 217, 240, 242, 245, 251, 259, 277; 340/507, 501, 500, 506, 584; 364/181, 184, 185, 186, 187, 188; 60/646, 645, 705, 706

[56] References Cited

U.S. PATENT DOCUMENTS

| | | |
|---|---|---|
| 3,223,590 | 12/1965 | Troeger . |
| 3,424,652 | 1/1969 | Oehmann . |
| 3,425,903 | 2/1969 | Bevilacqua . |
| 3,437,556 | 4/1969 | Bevilacqua et al. . |
| 3,680,069 | 7/1972 | Neumann et al. . |
| 3,764,467 | 10/1973 | Van Erp . |
| 3,892,954 | 7/1975 | Neuner . |
| 3,900,365 | 8/1975 | Barclay et al. . |
| 3,958,126 | 5/1976 | Bryant ........................... 340/507 X |
| 4,054,486 | 10/1977 | Lefebvre et al. .................... 376/215 |
| 4,184,514 | 1/1980 | Ryan et al. . |
| 4,200,864 | 4/1980 | Gillet et al. . |
| 4,272,725 | 6/1981 | Weiner et al. . |
| 4,292,129 | 9/1981 | Barry ............................. 376/217 X |
| 4,317,412 | 3/1982 | Bolcavage et al. . |
| 4,320,508 | 3/1982 | Takezoe . |
| 4,338,650 | 7/1982 | Wierschke ........................ 361/139 |
| 4,399,095 | 8/1983 | Morris .............................. 376/215 |
| 4,412,328 | 10/1983 | Homa . |
| 4,415,884 | 11/1983 | Delin et al. ...................... 340/507 X |
| 4,422,140 | 12/1983 | Keats . |
| 4,427,620 | 1/1984 | Cook . |
| 4,434,132 | 2/1984 | Cook . |
| 4,447,851 | 5/1984 | Simmons . |
| 4,562,035 | 12/1985 | Plaige ............................. 376/215 |

FOREIGN PATENT DOCUMENTS

| | | |
|---|---|---|
| 847141 | 4/1977 | Belgium . |
| 2494034 | 5/1982 | France . |
| 2049960 | 12/1980 | United Kingdom . |

OTHER PUBLICATIONS

Elektronik, vol. 26, No. 12, Dec. 1977, pp. 61–65, K. Meyer, "Sicherheitssysteme fur elektronisch gesteuerte Anlagen".

European Search Report, The Hague, 04-28-86.

Primary Examiner—William M. Shoop, Jr.
Assistant Examiner—Shik Luen Paul Ip
Attorney, Agent, or Firm—Daniel C. Abeles

[57] ABSTRACT

A power interface circuit periodically which receives test pulses to test the operation and connections thereof. Voltage and current sensors detect the result of the testing and may be used for zero-crossing detection when AC powered devices are controlled by the power interface circuit. Preferably, asymmetrical pulses, such as those representing an ASCII character, are used as the test pulses. Three input signals are received by the power interface circuit which performs two out of the three voting on the input signals to generate a control signal for two power switches. The power switches may be connected in parallel or in series to provide additional fault tolerance.

21 Claims, 12 Drawing Figures

TESTABLE, FAULT-TOLERANT POWER INTERFACE CIRCUIT FOR CONTROLLING PLANT PROCESS EQUIPMENT

BACKGROUND OF THE INVENTION

1. Field of the Invention

The present invention relates in general to a power interface circuit which controls the supply of power from a power supply to plant process equipment, and more specifically to a power interface circuit which controls pumps, valves, etc. in a pressurized light water nuclear power system.

2. Description of the Related Art

Plant process equipment, such as the equipment in a nuclear power system is conventionally controlled by redundant actuation circuits which receive input signals from redundant sensors. An example of how such redundant circuits are connected is described in U.S. Pat. No. 4,200,864 issued to Gillet et al. FIGS. 1-3 of this application correspond to FIGS. 1, 2 and 4 of Gillet et al. In Gillet et al., three probes $1A_i$, $1B_i$ and $1C_i$ are provided for each of n conditions (see FIG. 1). Majority decision circuits $2_i$ generate an output signal when at least two of the three corresponding probes indicate that a certain condition is present, such as a temperature at a particular location being greater than a maximum safe value RV. The outputs of the majority decision circuits $2_i$ are processed by logic circuits 3 and functional logic circuits 4 which supply control signals to a set of actuators 5 which may be configured to perform majority decision logic as illustrated by the relays 6 in FIG. 2 or to perform in the manner of an OR circuit as illustrated by the pumps 7 and valves 8 in FIG. 3. However, two out of three voting is also possible with valves, as described in U.S. Pat. No. 4,184,514 issued to Ryan et al.

In addition to the redundancy provided by conventional control circuits for critical plant processing equipment, such control circuits are conventionally designed to be testable to further improve their reliability. Usually, such testing requires the manual intervention of an operator with the result that the test of a single logic circuit 3 necessitates several hours according to Gillet et al. Elimination of such operator controlled testing has been suggested for units such as line printers, see U.S. Pat. No. 4,317,412 issued to Bolcavage et al., and communication networks, see U.S. Pat. No. 4,320,508 to Takezoe. However, with respect to power interface circuits, conventional systems are limited to self-testing of the status of contacts as described in U.S. Pat. No. 4,272,725 issued to Weiner et al. and do not include testing the circuit operation.

At least two problems must be overcome in order to produce power interface circuits which include automatic testing capabilities. The first problem area involves the complexity of redundant circuits. In order to replace the manual operations described in Gillet et al., complex automatic testing has been suggested, such as the multiplexer testing described in U.S. Pat. No. 4,422,140 issued to Keats.

The second problem area involves a conflict between testing the operation of an actuator and preventing inadvertent actuation of the device controlled by the actuator. Many of the systems in a nuclear power system are of the "fail-safe" type which are designed to be operated only in an emergency situation when another (independent) system fails to operate properly. Such "fail-safe" systems are required to be highly reliable and therefore, are preferrably testable. However, inadvertant actuation of such systems may cause partial or total shut down of the nuclear reactor and require a re-start period of as much as several weeks or more. The conventional test circuit disclosed in U.S. Pat. No. 3,437,556 to Bevilacqua et al. is an example of a conventional system which uses relays and therefore has to compromise between full testing of the system and the prevention of inadvertant actuations.

SUMMARY OF THE INVENTION

An object of the present invention is to provide a fault-tolerant power interface circuit which permits continuous automatic testing without actuation of a process control apparatus controlled by the power interface circuit.

Another object of the present invention is to provide a fault-tolerant power interface circuit which permits continuous testing that does not affect the ability of the circuit to control a process control apparatus in response to input signals.

Yet another object of the present invention is to provide a fault-tolerant power interface circuit which includes both voltage and current sensors for testing the ability of the circuit to control a process control apparatus connnected to the power interface circuit.

Still another object of the present invention is to provide a fault-tolerant power interface circuit which can be tested by an asymmetrical series of pulses to prevent noise being accepted as a proper test result.

An additional object of the present invention is to provide a fault-tolerant power interface circuit which provides AC power to a process control apparatus and is testable using pulse testing.

A further object of the present invention is to provide a power interface circuit which includes redundant power switches which can be connected to reduce inadvertent actuations or improve the likelihood of actuation of a process control apparatus which receives power from the power interface circuit and which is either energized to activate or de-energized to activate.

The above-mentioned objects are obtained by providing a power interface circuit which includes at least one voter which receives n input signals and generates a control signal when at least m input signals indicate that the control signal should be generated. The at least one voter is connected to at least two power switches, each of which is connected to two terminals so that the power switches can be connected in series or in parallel. Feedback means are connected to each of the power switches to supply signals indicating at least one of voltage across and current through each of the power switches.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
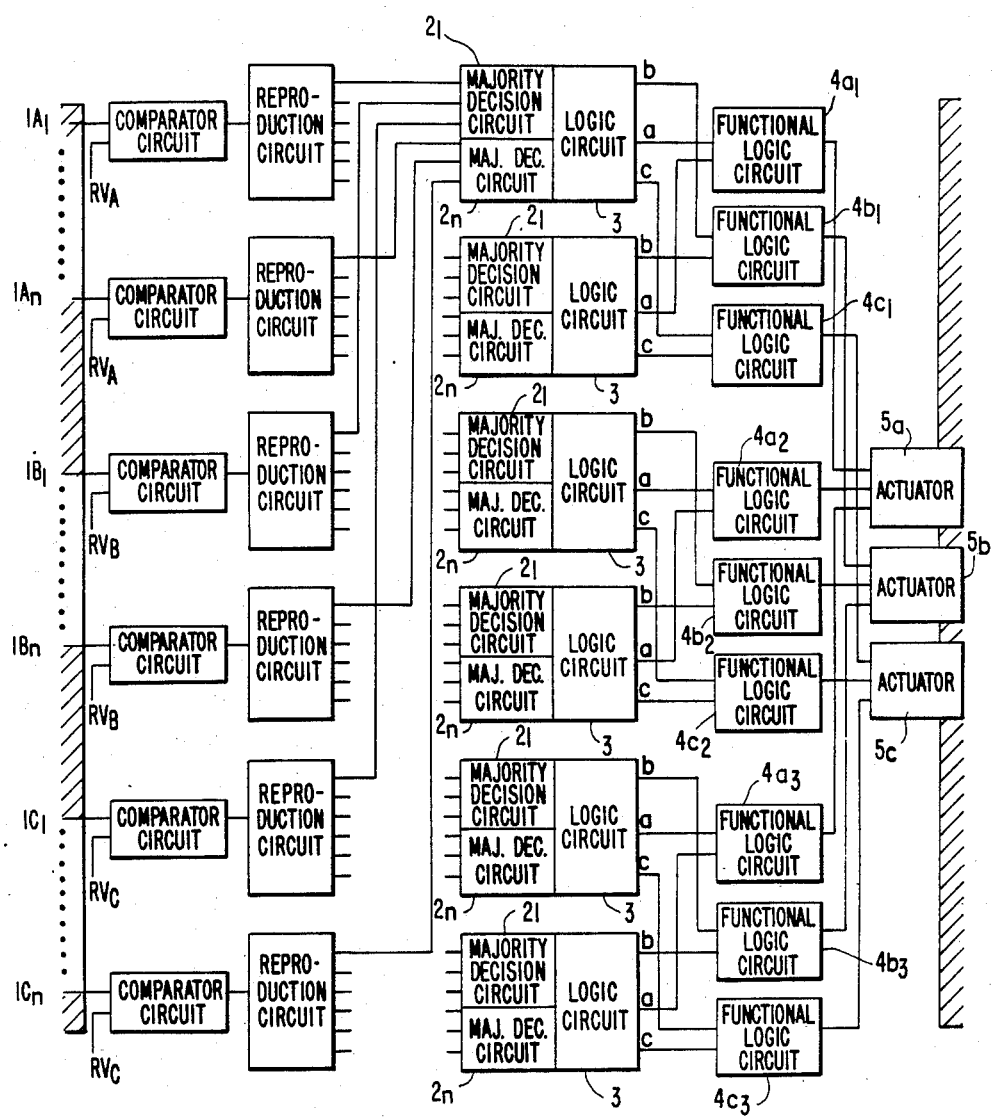
FIGS. 1-3 are block circuit diagrams of a prior art process control system.
Figure 2:
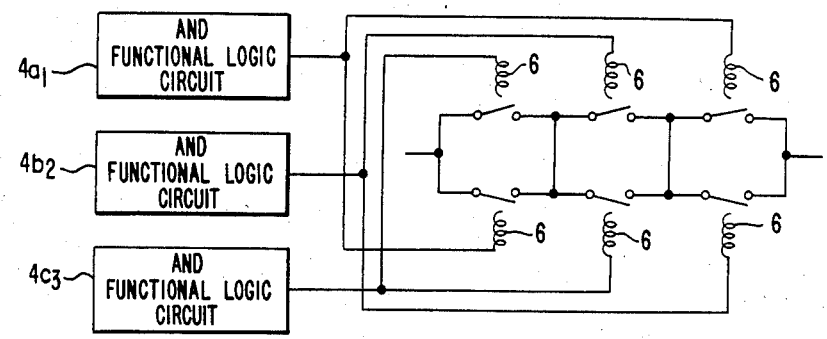
Figure 3:
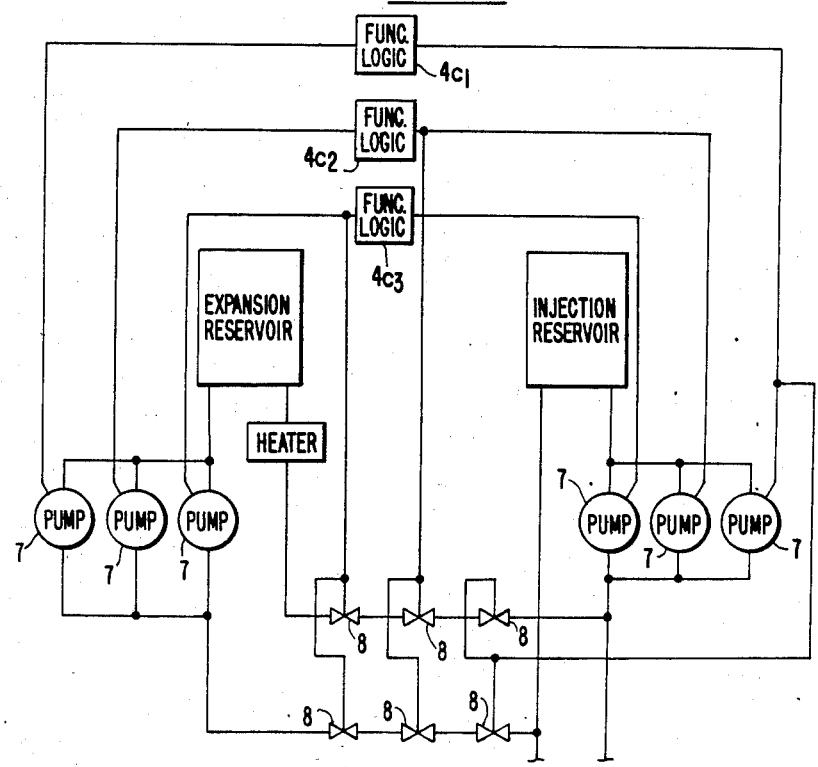
Figure 4:
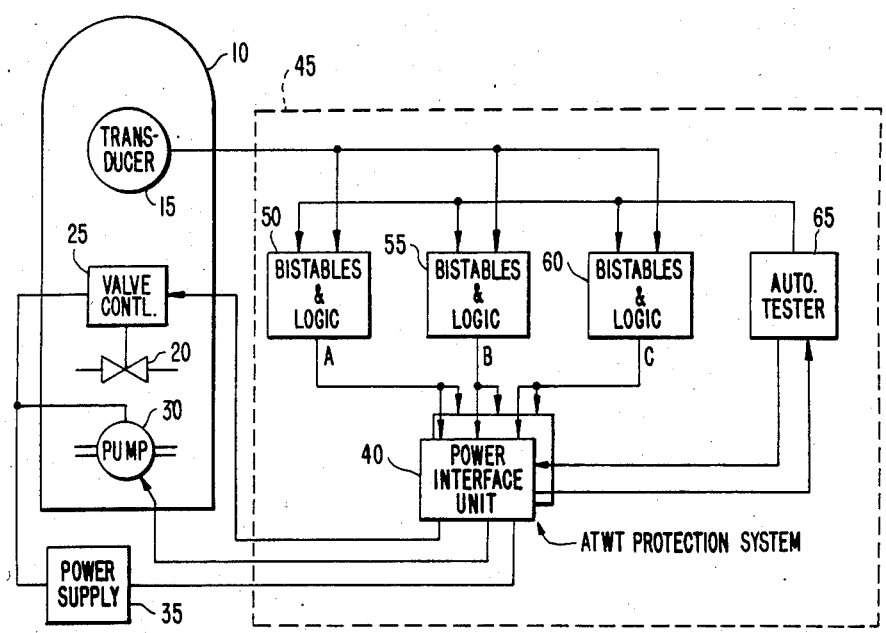
FIG. 4 is a block diagram of a portion of a nuclear power system.

A portion of a pressurized light water nuclear power system is illustrated in FIG. 4 as including a containment 10 in which a sensor 15, such as a transducer, is located to sense a condition, such as pressure. A valve 20 in the containment 10 is controlled by a valve control 25. The valve control 25 and a pump 30 within the containment 10 receive power from a power supply 35 under the control of a power interface unit 40. There are typically many independent control systems for a nuclear power system, each of which usually has several power interface units 40. In FIG. 4, an Anticipated Transient Without Trip (ATWT) protection system 45 is illustrated which is activated only if all other reactor control systems fail. Therefore, it is expected that the process control equipment, such as the valve 20 and pump 30, controlled by the ATWT protection system 45 will never be activated, but if they do need to be activated, it is essential that power can be supplied to the valve 20 and pump 30, etc.

In other words, it is important that the ATWT protection system 45 be very reliable. In the illustrated embodiments of the present invention, three input signals and two out of three voting are utilized to provide reliable operation; however, additional input signals and other components are within the scope of the present invention. As illustrated in FIG. 4, the transducer 15 provides an operating condition signal to each of three logic circuits 50, 55 and 60. The logic circuits 50, 55 and 60 provide input signals to the power interface units 40. In addition, an automatic tester 65 periodically generates test pulses and receives feedback signals for the power interface units 40. As described above, the testing provided by such test signals is essential to ensure that the power interface circuit 45 will be capable of operation if it is ever needed.

Figure 5:
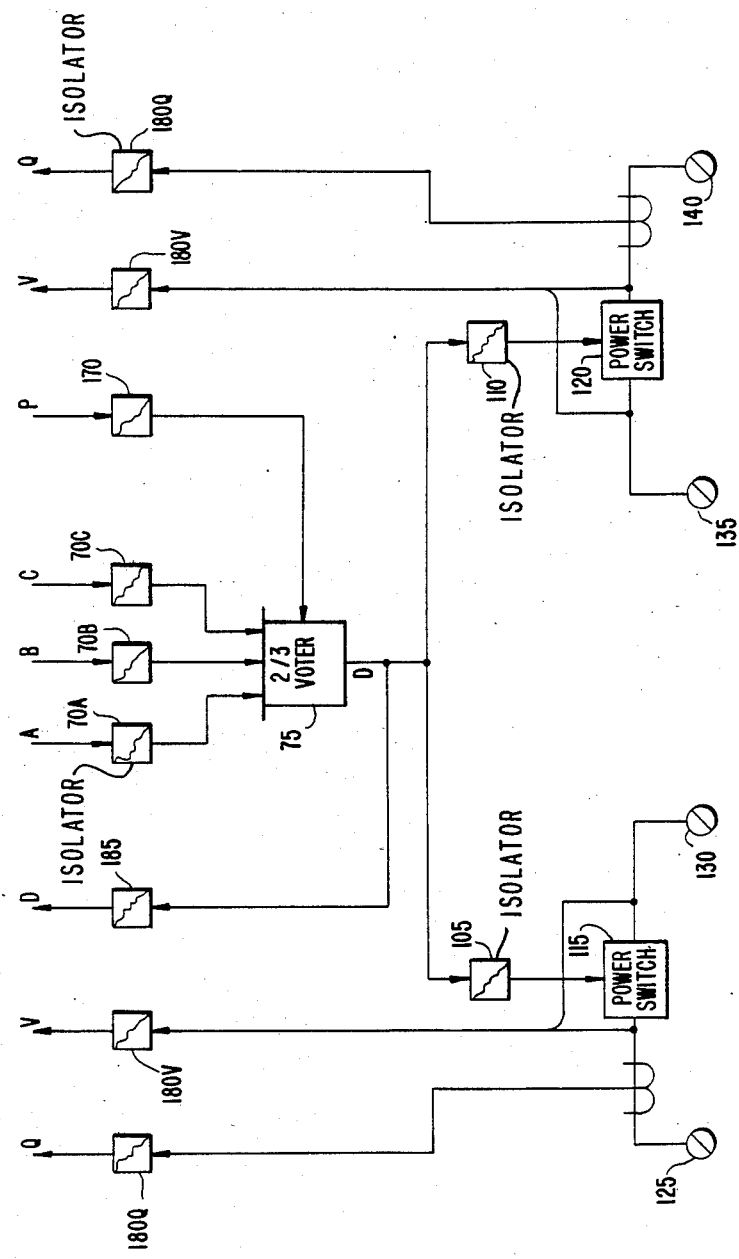
FIG. 5 is a block diagram of a first embodiment of the present invention.

A first embodiment of the power interface circuit 40 is illustrated in FIG. 5. The input signals or partial trip signals A, B and C pass through isolators 70A, 70B and 70C prior to being received by a two out of three voter 75. The voter 75 outputs a control signal D if any two of the input signals A, B and C have a "true" value indicating that control signal D should be generated by the voter 75.

Figure 6A:
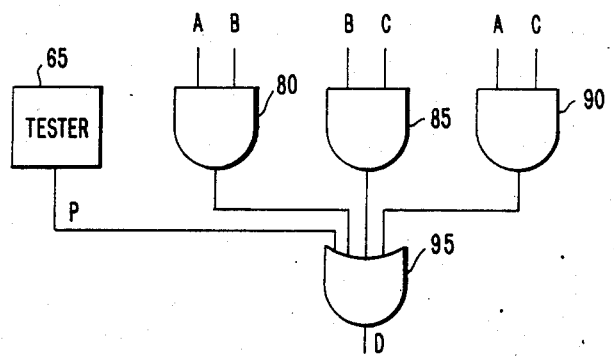
FIGS. 6A and 6B are first and second embodiments of the two out of three voter illustrated in FIG. 5.
Figure 6B:
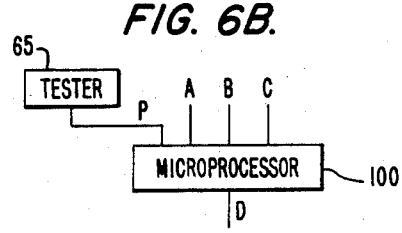

Two embodiments of the two out of three voter 75 are illustrated in FIGS. 6A and 6B. The embodiment of FIG. 6A comprises three AND gates 80, 85 and 90, each receiving a different pair of the input signals A, B and C and producing an output which is supplied to an OR gate 95. The output of the OR gate 95 is the control signal D. An alternative implementation of the two out of three voter 75 utilizes a microprocessor 100, such as an 8051 manufactured by Intel Corp., as illustrated in FIG. 6B, which performs the same combination of logic operations illustrated in FIG. 6A. The necessary program to sample the inputs and perform the simple voting logic of FIG. 6A could be provided by one of ordinary skill in the art.

Figure 7:
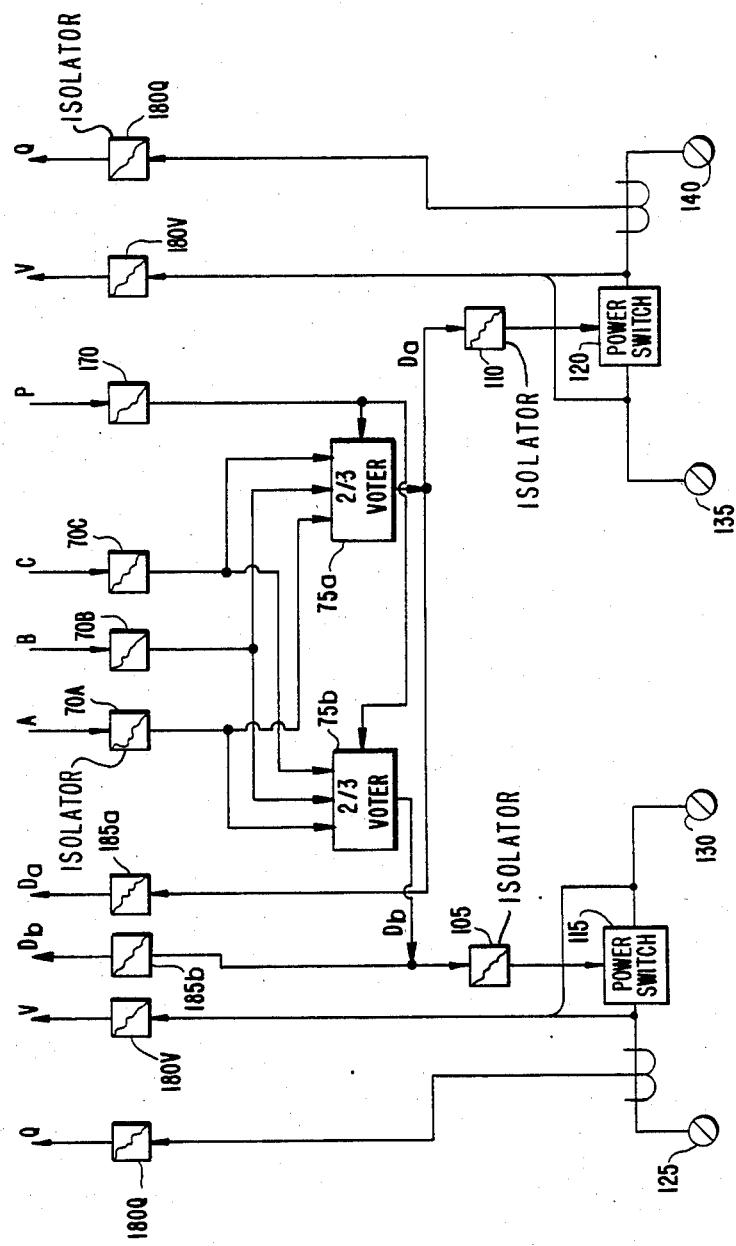
FIG. 7 is a block diagram of a second embodiment of the present invention.

A second embodiment of the power interface circuit 40 is illustrated in FIG. 7. In the embodiment of FIG. 7, two voters 75a and 75b are provided. Each of the two out of three voters 75A and 75B receives the three input signals A, B and C from the isolators 70A, 70B and 70C. Thus, the second embodiment, illustrated in FIG. 7, provides additional redundancy to protect against failure in one of the two out of three voters 75a and 75b.

The remainder of the first and second embodiments are the same. The control signal D (FIG. 5) or the individual control signals $D_a$ and $D_b$ (in FIG. 7) pass through a pair of isolators 105 and 110 prior to being supplied to power switches 115 and 120, respectively. The power switches are connected to terminals 125, 130, 135 and 140. Thus, the power switches 115 and 120 can be connected via the terminals 125, 130, 135 and 140 either in series or in parallel between the power supply 35 and a process control apparatus such as the valve control 25 or the pump 30 (FIG. 4).

Figure 8:
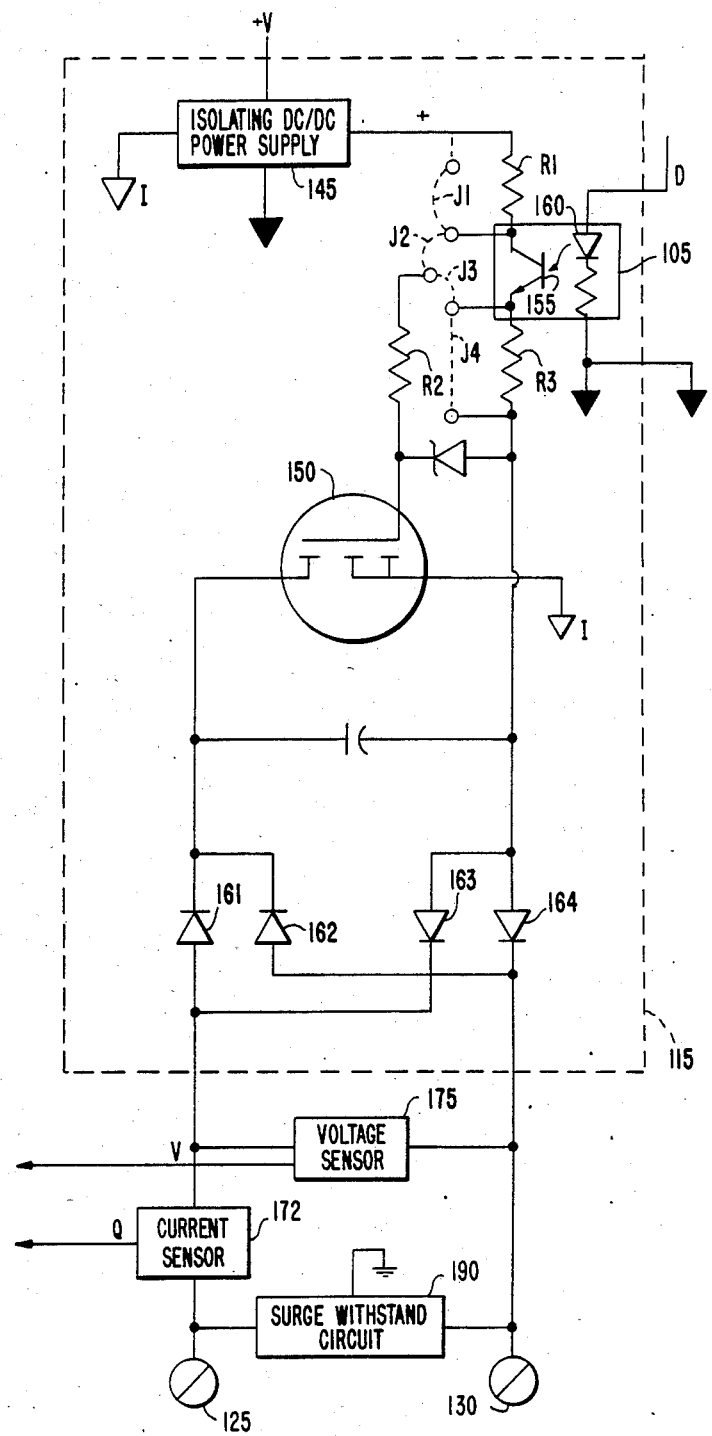
FIG. 8 is a circuit diagram of an embodiment of one of the power switches in FIG. 5.

An embodiment of the power switch 115 or 120 is illustrated in FIG. 8. An isolating DC/DC power supply 145 is connected to a transistor 150, such as an IRF451 FET manufactured by International Rectifier Corp., via a photo-transistor 155 energized by a light emitting diode 160 in the isolator 105. A network of resistors R1, R2 and R3 are connected by jumpers J1–J4. The connections of the jumpers J1-J4 are determined according to whether the power switch 115 (or 120) activates the process control apparatus 25 or 30 by energizing or deenergizing the actuator of the process control apparatus 25 or 30. If the process control apparatus 25 or 30 is actuated by being energized, jumper J1 is connected to short circuit resistor R1 and jumper J3 is connected to connect resistor R2 to the emitter of the phototransistor 155. If the process control apparatus 25 or 30 is actuated by being de-energized, jumper J2 is connected so that resistor R2 is connected to resistor R1 and the collector of the photo-transistor 155 and jumper J4 is connected to short circuit resistor R3. Since the isolating DC/DC power supply 145 is connected via node I to the source of transistor 150, the jumper connections described above will cause actuation of the process control apparatus 25 or 30 when control signal D is "true" regardless of whether actuation is by energizing or de-energizing. The diodes 161–164 are provided in the power switch 115 (and 120) so that the power being switched by transistor 150 may be direct current or alternating current.

Figure 9A:
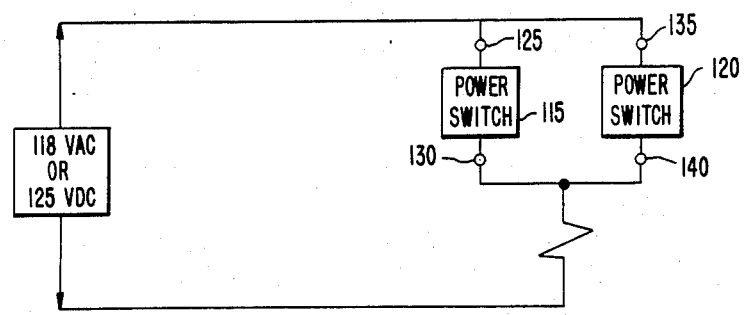
FIGS. 9A and 9B are block diagrams indicating connections of the power switches in FIG. 5 to a load, such as a process control apparatus, which maximize or minimize the likelihood of actuation of the load depending on whether the load is energized to activate or de-energized to activate.
Figure 9B:
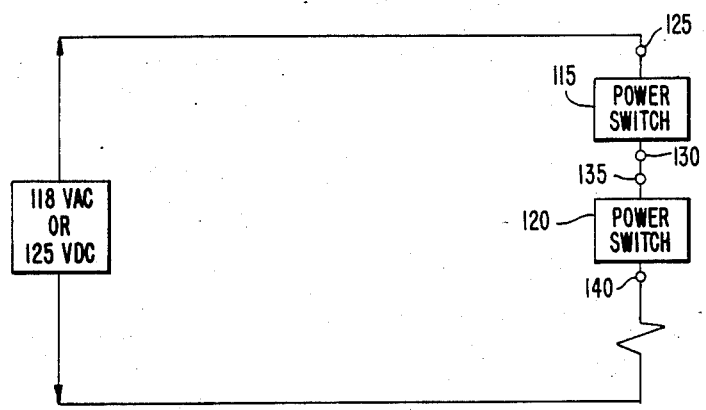

As described above, the terminals 125-140 are provided so that the power switches may be connected either in series or in parallel. The parallel configuration, illustrated in FIG. 9A, is used to increase the likelihood of actuation of a process control apparatus 25 or 30 which is energized to actuate or to reduce spurious actuation of a process control apparatus 25 or 30 which is de-energized to actuate. Alternatively, series connection of power switches 115 and 120, as illustrated in FIG. 9B, is used to reduce spurious actuations of a process control apparatus 25 or 30 which is energized to actuate and to increase the likelihood of actuation of a process control apparatus 25 or 30 which is de-energized to actuate.

The use of a solid state device, such as transistor 150, in the power switches 115 and 120 provides the capability of automatic testing of the circuitry of the power interface circuit, including the continuity of the lines connecting the terminals 125–140 to the power supply 35 and process control equipment 25 and 30, without actuating the process control equipment 25 and 30. Such testing can be provided by supplying a train of pulses P from the automatic tester 65 to the OR gate 95 or microprocessor 100 in the voter 75, as illustrated in FIGS. 6A and 6B. The train of pulses P are preferably asymmetrical so that electrical noise will not be accepted by the tester 65 as a proper response.

As illustrated in FIGS. 5 and 7, the test pulses P are supplied to the voter 75 via an isolator 170 which is part of a test circuit that includes the automatic tester 65 (FIG. 4). In the embodiment of FIG. 5, the test pulses P will cause the generation of a pulse control signal D. The pulse control signal D causes the power switches 115 and 120 to temporarily turn off or on, depending on whether the switches are normally closed or normally open, in a pattern similar to the test pulses P. Thus, if an asymmetrical series of pulses are used, such as the pulses representing an ASCII character (an internationally known coding standard), the resulting pattern at the output of the power switches 115 and 120 can be sensed by a feedback circuit which includes a current sensor 172 or voltage sensor 175. The current sensed by the current sensor 172 (FIG. 8) is indicated by a current feedback signal Q output from an isolator 180Q (FIGS. 5 and 7, which provides electrical isolation between the current sensor 172 and the feedback signal Q. The voltage sensed by the voltage sensor 175 (FIG. 8) is indicated a voltage feedback signal V output from an isolator 180V (FIGS. 5 and 7) which provides electrical isolation between the voltage sensor 175 and feedback signal V.

Preferably, the current and voltage sensors 172 and 75 are both provided in the power interface circuit, so that the power interface circuit may be used for AC or DC process control equipment which are either energized or de-energized to actuate. In the case of DC equipment, either sensor 172 or 175 would be sufficient, however, in the case of AC equipment, the sensors 172 and 175 may be used for zero-crossing detection to determine when the tester 65 should generate the pulses P. For example, if an INTEL 8021 chip is used in the tester 65, the sensor 172 or 175 could be connected to the T1 line to provide zero-crossing detection. In the case of a de-energize to actuate AC apparatus, it is necessary to detect the current flowing through the power switches 115 and 120 in order to determine when to supply the test pulses. In the case of an energize to actuate AC apparatus, it is necessary to detect the voltage across the power switches 115 and 120 to determine when to supply the test pulses P.

Figure 10:
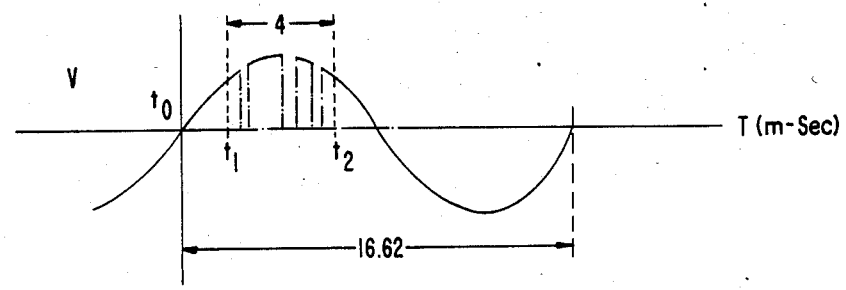
FIG. 10 is a graph of one cycle of an alternating current depicting the result of pulse testing of the power switches illustrated in FIG. 5.

A graph of a single AC cycle is illustrated in FIG. 10 for a de-energize to actuate apparatus. The current sensor 172 would detect no current at time $t_0$ and the tester 65 would have to delay two milliseconds to generate the illustrated asymmetrical series of pulses during the four millisecond time period from $t_1$ to $t_2$. Assuming the power switches 115 and 120 are configured to respond to control signal D to de-energize the process control apparatus 25 or 30, the waveform illustrated in FIG. 10 will result.

As illustrated in FIG. 4, the automatic tester 65 is also expected to test the logic circuits 50, 55 and 60. As a result, a connection is provided in the power interface circuit to supply the command signal D via an isolator 185 to indicate the results of such logic testing on the command signal D.

Testing in the second embodiment, illustrated in FIG. 7, is similar. The test pulses are supplied to the voters 75A and 75B via the isolator 170. The resulting command signals $D_a$ and $D_b$ are supplied to the tester 65 via isolators 185A and 185B. Thus, a failure in one of the voters 75a or 75b can be detected by the tester 65.

Furthermore, surge withstand testing is conventionally performed in the control system of a nuclear power system. Therefore, a surge withstand circuit 190 is provided across each pair of the terminals 125–140, as illustrated across terminals 125 and 130 in FIG. 8.

The many features and advantages of the present invention are apparent from the detailed specification, and thus it is intended by the appended claims to cover all such features and advantages of the circuit which fall within the true spirit and scope of the invention. Further, since numerous modifications and changes will readily occur to those skilled in the art, it not desired to limit the invention to the exact construction and operation illustrated and described, accordingly, all suitable modifications and equivalents may be resorted to, falling within the scope and spirit of the invention.

What is claimed is:

1. A power interface circuit for supplying power from a power supply to a plant process control apparatus in dependence upon n input signals, comprising:
   voter means, operatively connectable to receive the input signals, for generating a control signal when at least m of the n input signals indicate that the control signal should be generated;
   power switches, operatively connected to said voter means and operatively connectable to the power supply and the process control apparatus, for supplying the power to the process control apparatus in dependence upon the control signal;
   test pulse means, operatively connected to said voter means, for periodically supplying asymmetrical pulses to test said power switches without activating the process control apparatus; and
   feedback and isolation means, having inputs operatively connected to said power switches, for outputting at least one of current and voltage feedback signals which respectively indicate one of current through and voltage across each of said power switches and for providing electrical isolation between said power switches and the at least one of current and voltage feedback signals 2. A power interface circuit as recited in claim 1, wherein m is less than or equal to n.

3. A power interface circuit as recited in claim 1, wherein m is less than n and m is at least as large as one-half of n.

4. A power interface circuit as recited in claim 1, wherein m equals 2 and n equals 3.

5. A power interface circuit as recited in claim 4,
   wherein the three input signals comprise first, second and third input signals, and
   wherein said voter means comprises:
   a first AND gate operatively connectable to receive the first and second input signals;

a second AND gate operatively connectable to receive the second and third input signals;

a third AND gate operatively connectable to receive the first and third input signals; and an OR gate operatively connected to said first, second and third AND gates, said test pulse means and said power switches.

6. A power interface circuit as recited in claim 5, further comprising isolation means, operatively connected to said OR gate and said power switches, for electrically isolating the control signal and said power switches.

7. A power interface circuit as recited in claim 4, wherein said voter means comprises a microprocessor operatively connectable to receive the input signals and operatively connected to said power switches, for generating the control signal in dependence upon the input signals.

8. A power interface circuit as recited in claim 7, further comprising isolation means, operatively connected to said microprocessor and said power switches, for electrically isolating the control signal and said power switches.

9. A power interface circuit as recited in claim 1, wherein said voter means, comprises voters, each of said voters operatively connectable to receive the input signals and operatively connected to a corresponding one of said power switches for supplying the corresponding one of said power switches with the control signal.

10. A power interface circuit for supplying power from a power supply to a process control apparatus in a pressurized light water nuclear power system in dependence upon three input signals, comprising:
   a voter, operatively connectable to receive the three input signals, generating a control signal when at least two of the three input signals indicate that the control signal should be generated;
   first and second isolators operatively connected to said voter;
   first and second power switches, operatively connected to said first and second isolators and operatively connectable to the process control apparatus and the power supply, for supplying the power to the process control apparatus in dependence upon the control signal;
   a test circuit operatively connected to said voter and periodically supplying asymmetrical pulses to test said power switches without activating the process control apparatus; and
   a feedback and isolation circuit having inputs operatively connected to said power switches and outputting at least one of current and voltage feedback signals which respectively indicate one of current through and voltage across each of said power switches and for providing electrical isolation between said power switches and the at least one of current and voltage feedback signals.

11. A power interface circuit as recited in claim 10, further comprising third, fourth and fifth isolators, each operatively connected to said voter and operatively connectable to receive one of the three input signals, for providing electrical isolation between said voter and the three input signals, and wherein said test circuit includes a sixth isolator, operatively connected to receive the asymmetrical pulses and to said voter, for providing electrical isolation between the asymmetrical pulses and said voter.

12. A power interface circuit as recited in claim 10, wherein the three input signals comprise first, second and third input signals, and
wherein said voter comprises:
   a first AND gate operatively connectable to receive the first and second input signals;
   a second AND gate operatively connectable to receive the second and third input signals;
   a third AND gate operatively connectable to receive the first and third input signals; and
   an OR gate operatively connected to said first, second and third AND gates, said test circuit and said first and second isolators.

13. A power interface circuit as recited in claim 10, wherein said voter comprises a microprocessor, operatively connected to said test circuit and said first and second isolators and operatively connectable to receive the three input signals, for generating the control signal in dependence upon the input signals.

14. A power interface circuit as recited in claim 10, wherein said feedback and isolation circuit comprises.
   first and second voltage sensors, operatively connected to said first and second power switches, respectively, for indicating the voltage across said first and second power switches, respectively;
   first and second current sensors, operatively connected to said first and second power switches, respectively, for sensing the current passing through said first and second power switches, respectively; and
   third, fourth, fifth and sixth isolators operatively connected to said first and second voltage sensing means and said first and second current sensing means, respectively.

15. A power interface circuit as recited in claim 10, wherein the control signal is generated by said voter to close said first and second power switches, and said first and second power switches are operatively connected in parallel between the power supply and the process control apparatus which is activated when either of said first and second power switches is closed.

16. A power interface circuit as recited in claim 10, wherein the control signal is generated by said voter to close said first and second power switches, and said first and second power switches are operatively connected in series between the power supply and the process control apparatus which is activated when both of said first and second power switches are closed.

17. A power interface circuit as recited in claim 10, wherein the control signal is generated by said voter to open said first and second power switches, and said first and second power switches are connected in parallel between the power supply and the process control apparatus which is activated when both of said first and second power switches are open.

18. A power interface circuit as recited in claim 10, wherein the control signal is generated by said voter to open said first and second power switches, and said first and second power switches are connected in series between the power supply and the process control apparatus which is activated when either of said first and second power switches is open.

19. A power interface circuit as recited in claim 10, wherein the power supplied by said first and second power switches is direct current.

20. A power interface circuit as recited in claim 10, wherein the power supplied by said first and second power switches is alternating current and the asymmetrical pulses supplied by said test circuit are supplied substantially during a peak in the alternating current.

21. A power interface circuit as recited in claim 10, wherein the asymmetrical pulses represent an American Standard Code for Information Interchange (ASCII) character.

* * * * *